350-358
XR 3,676,592
T 3093T

United States Patent
Foster

[15] 3,676,592
[45] July 11, 1972

[54] HIGH-RESOLUTION LINEAR OPTICAL SCANNING SYSTEM WITH TRAVELING WAVE ACOUSTIC LENS

[72] Inventor: Leigh Curtis Foster, Atherton, Calif.
[73] Assignee: Zenith Radio Corporation, Chicago, Ill.

[22] Filed: Oct. 30, 1969
[21] Appl. No.: 872,559

[52] U.S. Cl. ....178/7.6, 250/199, 350/160, 350/161
[51] Int. Cl. ....G02f 1/28, G02f 1/36, H04n 1/04
[58] Field of Search ....250/199; 178/7.6; 350/161

[56] References Cited

UNITED STATES PATENTS

| | | | |
|---|---|---|---|
| 3,516,731 | 6/1970 | Whinnery | 350/161 |
| 3,528,727 | 9/1970 | Halliday | 350/160 |
| 3,531,184 | 9/1970 | Adler | 350/161 |
| 3,165,045 | 1/1965 | Troll | 178/7.6 |
| 3,471,641 | 10/1969 | Baker | 178/7.6 |
| 3,488,503 | 1/1970 | Reich | 250/199 |
| 3,498,693 | 3/1970 | Fein | 178/7.6 |
| 3,507,553 | 4/1970 | Anderson | 250/199 |
| 3,516,729 | 6/1970 | Adler | 178/7.6 |

*Primary Examiner*—Benedict V. Safourek
*Assistant Examiner*—Joseph A. Orsino, Jr.
*Attorney*—John J. Pederson

[57] ABSTRACT

The focusing properties of a traveling elastic wave are employed to convert a low-resolution input light beam into a high resolution output beam, both beams scanning linearly in synchronism with the phase velocity of the elastic wave. The elastic wave can be a dilational wave in a transparent solid or liquid of, for example, acoustic character, or a flexural wave on a thin reflector. Specifically, scanning optical beam is projected through appropriate optics to focus on the input plane of the traveling-wave dynamic lens in such a way as to scan transversely at the velocity of a traveling acoustic wave. The acoustic wave is phased such that the instantaneous axis of symmetry of the traveling lens coincides with the optical axis of the scanning input beam, and this relationship is maintained throughout the duration of the line scan. The size of the input spot is restricted to cover a total of approximately one-fourth of an acoustic wavelength, in order to avoid aberrations in the dynamic lens.

24 Claims, 8 Drawing Figures

3676592
NO OR CLASSIF

Inventor
Leigh Curtis Foster
By John J. Pederson
Attorney

HIGH-RESOLUTION LINEAR OPTICAL SCANNING SYSTEM WITH TRAVELING WAVE ACOUSTIC LENS

This invention relates to optical scanning systems and more particularly to means for providing substantially improved image resolution in such systems.

A principal limitation on the utilization of optical scanning systems for television display and television recording has been the limited image resolution heretofore provided by practical and desirable types of optical scanning systems. High resolution can be obtained by the use of rotating or vibrating mirrors for scanning deflection, but reliance on mechanical systems for scanning deflection is obviously undesirable. There are of course electro-optical systems which do not rely on mechanical scansion, but these are characterized by resolution capabilities which are undesirably low for image projection or recording purposes. Recent improvements in the electro-optical art have made it possible to realize resolutions up to about 400 spot diameters which is adequate for conventional TV standards, but at the expense of undesirable complications in equipment and control circuitry. Non-mechanical electro-optical scanning systems have been totally unadaptable to use in image display projection or recording systems having a higher resolution requirement.

Accordingly, it is a principal object of the present invention to provide a new and improved optical scanning system.

It is a more particular object of the invention to provide apparatus for materially improving the obtainable image resolution with an electro-optical scanning system.

Yet another object of the invention is to provide such improved image resolution without the use of mechanically moving parts.

In accordance with the invention there is provided, in combination with a linear scanning system for scanning a light beam in a predetermined plane centered on a predetermined axis with a predetermined spot resolution, means for substantially increasing the spot resolution comprising an electromechanical transducer coupled to an acoustic wave transmitting medium for projecting a traveling acoustic-wave convergent lens across the axis in synchronism with the scanning beam.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figures 1, 2:
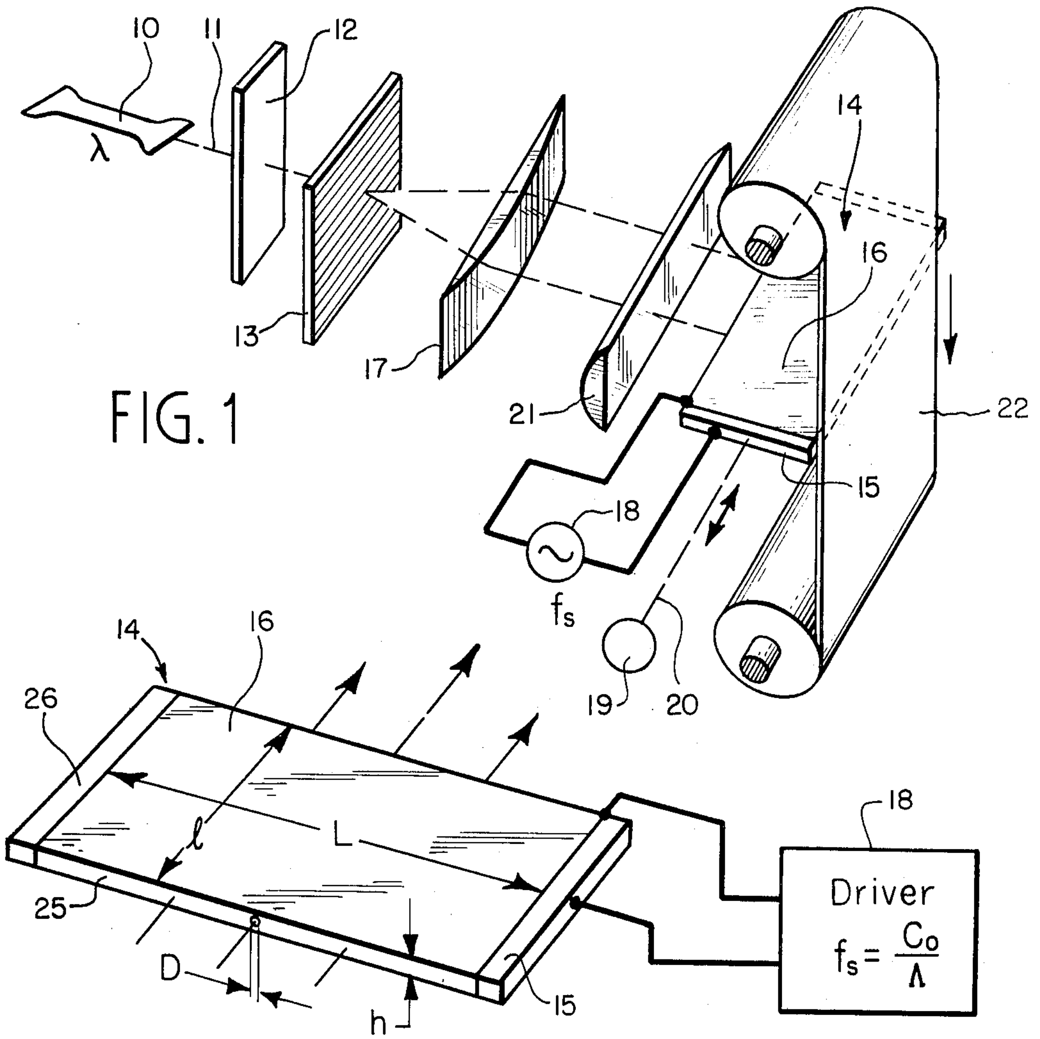
FIG. 1 is a perspective schematic diagram of an optical scanning system embodying the present invention.
FIG. 2 is a detailed perspective view of a liquid acoustic wave guide which constitutes a component of the system of FIG. 1.

In the perspective schematic view of FIG. 1, a laser 10 projects a light beam of wavelength λ along a horizontal axis 11 through an intensity modulator 12 and a horizontal scanner 13. Modulator 12 may be any of a variety of known electro-optical intensity modulation devices for use with a laser beam, and scanner 13 may also be of any known electro-optical type for producing lateral scansion of the light beam from laser 10 in a horizontal plane. More particularly, and strictly by way of example, modulator 12 may constitute a Bragg diffraction light modulator of the type described in an article entitled "Interaction Between Light and Sound" by Robert Adler, IEEE SPECTRUM, pages 42–54, May, 1967, and horizontal scanner 13 may be of the type described and claimed in U.S. Pat. application Ser. No. 600,500, now U.S. Pat. No. 3,493,759 for "ACOUSTIC BEAM STEERING WITH ECHELON TRANSDUCER ARRAY," and assigned to the present assignee. A detailed description of suitable modulating and deflection elements may be obtained in an article entitled "A Television Display Using Acoustic Deflection and Modulation of Coherent Light" by A. Korpel et al., PROCEEDINGS IEEE, Volume 54, pages 1,429–1,437, Oct., 1966, or from U.S. Pat. No. 3,154,534, "Wide Aperture Laser Beam Modulating and Scanning System," assigned to the present assignee.

It has been difficult with such systems to provide image resolution in excess of 200 resolvable spots, which corresponds to video frequencies of about 2 megaHertz. By contrast, the transmission specifications for broadcast television provide a 4-mega-Hertz video bandwidth which is equivalent to an image resolution of more than 400 resolvable spots. Thus, the use of prior electro-optical scanning systems for television image display purposes has resulted in some picture degradation or in other words has failed to make full utilization of the entire amount of picture information contained in the broadcast 4-megaHertz video signal bandwidth.

In accordance with the invention, a dynamic scanning lens cell 14 in the form of a liquid elastic waveguide, comprising an electromechanical transducer 15 coupled to an acoustic wave transmitting medium such as water contained within a casing 16, is provided. The output beam from horizontal scanner 13 is passed through a cylindrical collimating lens 17 so that the input beam to dynamic lens cell 14 is parallel to optical axis 11 of the system throughout the entire scan. An electrical signal source 18 is connected to transducer 15 to produce a traveling elastic wave, in this case an acoustic compressional wave, of frequency $f_s$ and acoustic wavelength Λ in the elastic-wave-transmitting medium of cell 14, in this case water. A suitable mechanical control, indicated schematically by a control knob 19 coupled to cell 14 by means of a simple mechanical linkage 20, is provided for laterally adjusting the position of cell 14 in the horizontal scanning plane, as indicated by the arrow associated with linkage 20. The cell 14 is provided with a characteristic-impedance termination to prevent acoustic wave reflections and avoid standing waves.

Application of a continuous wave signal of frequency $f_s$ from source 18 to transducer 15 results in the generation of a periodic compressional wave in the water contained in light-sound interaction cell 14. The frequency $f_s$ of the actuating signal is selected relative to the propagation velocity in the acoustic wave transmitting medium and the scanning velocity of the input beam from horizontal scanner 13 to provide accurate time and portion synchronism, (i.e., tracking) between the acoustic wave in the light-sound interaction cell and the optical input beam. An initial phasing adjustment is provided by means of control knob 19 and mechanical linkage 20. This in effect creates an acoustic wave cylindrical convergent lens which is always centered on the optical input beam. As verified by measurements of DiMaria and Danielson reported in an article entitled "Internal Laser Modulation by Acoustic Lens Like Effects," appearing in IEEE JOURNAL QUANTUM ELECTRONICS, Volume QE-2, pages 157–164, July, 1966, a region of approximately 50° on either side of the pressure maximum operates as an excellent cylindrical focusing lens as long as the F number of the lens is quite large, for example 20. This yields convergence of the extreme rays of approximately 3° and can provide an order of magnitude improvement in spot resolution.

Preferably, in the system of FIG. 1, a static cylindrical lens 21 with its axis parallel to the scanning plane is provided to assure spot symmetry in the output beam from dynamic lens cell 14. Lens 21 may be positioned either before or after the light-sound interaction cell 14 or, if desired, may be combined with collimating lens 17 as a single optical component of compound configuration.

To complete the image display system, a photographic film strip is positioned for vertical movement (as indicated by the arrow) in the focal plane of the dynamic lens cell 14, to provide the vertical scanning component. The vertical transport mechanism 22 may be of any known construction, such as those used in video tape recorders or the like. Alternatively, a vertical scanner of any desired construction may be provided; since the vertical scanning rate is only 60 cycles per second, mechanically movable elements may be employed if desired, although Bragg diffraction scanning is feasible at vertical rates also. With such an alternative system, a two-dimensional scanned image is formed on a target which may constitute, for example, a projection screen or a photographic film.

The construction of dynamic lens cell 14 is shown in greater detail in FIG. 2. Transducer 15, which may be a thickness-polarized thin strip element of barium titanate or the like, is provided with conductive surface electrodes between which driving signal source 18 is connected, and is attached to a casing 16 filled with water, although other liquid or solid acoustic transmitting media may be employed if desired. Casing 16 is preferably composed primarily of metal or other rigid material having an acoustic impedance with as great a mismatch as possible as compared with that of the acoustic wave transmitting medium contained within, but is provided with a glass window 25 for transmitting the input beam and a similar glass window (not visible in the figure) for permitting egress of the output beam. The light-sound interaction cell is terminated by an acoustic wave absorbing element 26 to prevent reflections and avoid undesired standing waves; for a water cell, the absorber may be composed of a loosely formed bundle of fiberglass wool or the like with a thickness of 20 wavelengths or more in the direction of acoustic wave propagation, and with interstices smaller than the acoustic wavelength in water. The cell is of a sufficient length L in a direction transverse to the optical axis 11 of the system to accommodate the scan length and, for waveguide type operation, is of a height $h$ which is less than the acoustic wavelength $\Lambda$ of the compressional wave in the acoustic wave transmitting medium, but in excess of $\Lambda/4$. Preferably, the driving signal frequency $f_s$ is selected to provide an acoustic wavelength $\Lambda$ which is approximately equal to four times the incoming beam spot diameter D, so that a quarterwave section of the compressional wave tracks the input beam to provide the optimum cylindrical lens effect. For optimum performance, length $l$ of the cell in the direction of optical beam propagation is substantially equal to the focal length of the traveling effective cylindrical lens, so that the plane of maximum focusing coincides with the output surface of the lens; in many applications, however, it may be desired to locate the image target or utilization means at a location displaced from the focal plane of the dynamic focusing lens, and this may be accomplished by providing conventional optical components operating as a telescope between the dynamic lens and the utilization means.

In some applications, waveguide type operation is not required, and the dynamic lens cell may be made many acoustic wavelengths in height to accommodate the cell to the particular optical environment of the system involved.

Figure 3:
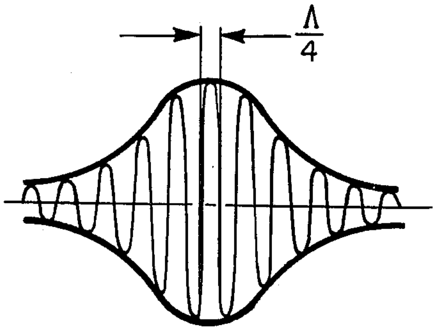
FIG. 3 is a graphical representation of the driving signal applied to the driving transducer of the wave guide shown in FIG. 2.

In a linear scanning system of the type under consideration, it is not necessary to provide a continuous wave traveling acoustic lens and therefore it is not necessary to use a continuous wave driving signal from source 18. Instead, a single acoustic pulse, repeated at the horizontal scanning frequency of 15,750 Hertz with present U.S. television scanning standards, may be employed, preferably with a Gaussian distribution of energy as shown in FIG. 3. The effective traveling acoustic wave convergent cylindrical lens is produced at the peak of the Gaussian pulse and is of a duration corresponding to approximately one-fourth the acoustic wavelength in the acoustic signal transmitting medium of the cell. Pulsed actuation in this manner affords a substantial advantage in reduced driving power requirements, with consequent alleviation in the problem of providing for adequate heat dissipation for the dynamic lens cell.

A better appreciation of the operation of the system and of the improvement in spot resolution which is obtained in accordance with the invention may be had by considering some specific numerical examples. It may be assumed, for example, that the basic spot resolution capability $N_1$ of the horizontal scanner 13 is 200 resolvable spots as in the case of the experimental system referred to in the Adler and the Korpel et al. literature references previously identified. If water is employed as the acoustic wave transmitting medium in the dynamic lens cell, the velocity of sound in the cell is approximately 1.5 millimeters per microsecond. At a television horizontal scanning frequency of 15,750 Hertz, the scanning time (horizontal period less retrace time) may be approximated at 52 microseconds, which means that the length of the horizontal scan is about 8 centimeters. For 200 spot resolution in an 8-centimeter scanning length, the individual spot size, which is the diameter D of the input beam, is approximately 400 microns. If the effective F-number of the acoustic wave traveling cylindrical lens is approximated at 20, then the length $l$ of the cell in the direction of optical beam propagation should be approximately 1.26 centimeters. In accordance with fundamental optics, the minimum obtainable final spot size at the focal point is equal to $4/\pi$ times the F-number times the light wavelength, so that if laser 10 produces light of a wavelength $\lambda$ equal to 6,328 Angstrom units, a final spot size of approximately 16 microns may be obtained. This represents an improvement factor $N_1/N_o$ of approximately 25 times, yielding an ultimate spot resolution expectation of 5,000 spots.

For optimum spot resolution improvement, as explained above, the spot diameter D of the incoming beam should be equal to approximately one-fourth the acoustic wavelength in the sound transmitting medium of the dynamic lens cell 14. With an incoming beam spot diameter D of 400 microns, the acoustic wavelength $\Lambda$ should therefore be approximately 1.6 millimeters and the required driving signal frequency $f_s$ is 0.94 megaHertz, with a repetition frequency of the Gaussian input pulses corresponding to the horizontal scanning rate of 15,750 Hertz.

The significant parameters of the dynamic lens cell are set forth without derivation or proof in the following text, as an aid to the design of specific cells for use in a system embodying the present invention. In the following relations, $n$ is the index of refraction of the acoustic-wave transmitting medium and $\Delta n$ is the maximum change in index of refraction in response to the compressional acoustic wave. F is the effective F-number of the dynamic acoustic-wave lens. $f_o$ is the focal length in meters, W the acoustic wave power in watts, I is the acoustic-wave intensity in watts per square meter, P the peak pressure in the sound transmitting medium in newtons per square meter, and $N_1/N_o$ is the resolution improvement factor or spot number advantage provided by the dynamic lens. M is the Smith-Korpel figure of merit for the acoustic medium as defined in an article by T.M. Smith and A. Korpel, "Measurement of Light-Sound Interaction Efficiencies in Solids," J. QUANTUM ELECTRONICS, Vol. QE-1, No. 6 pages 283–284, Sept., 1965, and is expressed as follows:

$$M=\frac{n^6 p_0^2}{\rho_0 c_0^3}, \qquad (1)$$

where $p_o$ is the elasto-optic constant, $\rho_o$ is the density of the acoustic wave transmitting medium, and $c_o$ is the acoustic wave velocity in the medium. $\Lambda$ is the acoustic wavelength and $\lambda$ the wavelength of the incident light beam.

In terms of the peak refraction index variation $\Delta n$, the focal distance $f_0$ of the dynamic acoustic-wave lens is given by:

$$f_0=\frac{\Lambda}{4}\sqrt{\frac{n}{\Delta n}} \quad (2)$$

The effective F-number at the focus is given by:

$$F=\frac{2}{\pi}\sqrt{\frac{n}{\Delta n}} \quad (3)$$

In order to achieve the above focal length and F-number, a certain acoustic intensity I is required in the medium. This is given by:

$$I=(2)/(M)(\Delta n)^2 \quad 4.$$

Assuming that the acoustic beam cross-section is a rectangle of length $f_0$ and height $\Lambda/2$ (twice as high as the optical beam is wide), then the total required power W in the acoustic wave is given by:

$$W=\frac{If_0A}{2}=\frac{\Lambda}{4M}\sqrt{n\,(\Delta n)^3} \quad (5)$$

The peak dynamic pressure P in the medium is of interest from the standpoint of determining the ultimate practical limit to the intensity which can be achieved; it is given by:

$$P=\sqrt{2\rho_0c_0I}=2\Delta n\sqrt{\frac{\rho_0c_0}{M}}=\frac{2\Delta n\rho_0c_0^2}{n^3p_0} \quad (6)$$

Finally, the spot-number advantage, which is the ratio of the number of spots in the final focal plane to that in the input focal plane, is given by:

$$\frac{N_1}{N_0}=\frac{\pi\Lambda}{8\lambda}\sqrt{\frac{\Delta n}{n}} \quad (7)$$

As a further aid in visualizing and understanding the resolution improvement obtainable with the use of the dynamic acoustic lens, an illustrative example employing water as the sound transmitting medium is presented below. The previous numerical case for which $\lambda$ is 0.6328 $\mu$m, $\Lambda$ is 1.6 mm, $f_s$ is 0.94 MHz, D is 400 $\mu$m, $N_0$ is 200 spots in a scan width of about 8 cm, corresponding to a TV line of 52 $\mu$sec scanning time, is assumed. For illustrative purposes, it is further assumed that $\Delta n$ is $10^{-4}$. Thus, from the foregoing relationships, the calculated focal length $f_0$ is 4.6 cm, and the F-number is 73. The required intensity in the water (noting that $M = 1.6 \times 10^{-13}$ sec$^3$/kg) is $1.25 \times 10^5$ watts/meter$^2$ or 12.5 watts/cm$^2$, which implies a peak dynamic pressure of $6.1 \times 10^{5}$ newtons/m$^2$, or about 6 atmospheres. The total power W required is 4.6 watts. The spot-number improvement ratio for this case is $N_1/N_0 = 8.6$, corresponding to a final spot resolution $N_1$ of over 1,700 spots.

If desired, the dynamic lens cell may employ a transparent solid material such as glass or quartz as the acoustic wave transmitting medium, although generally a greater improvement is obtainable with a liquid cell because of the lower sound velocity. In any event, the cell should be provided with an acoustic impedance termination to avoid reflections and standing waves. The specific design parameters will vary of course as a function of the material selected.

The use of a dynamic lens cell employing a liquid or a solid elastic wave-transmitting medium for developing a traveling wave convergent cylindrical acoustic wave lens with acoustic compressional-mode vibrations yields significant and attractive resolution improvements in numerous applications. In others, however, and particularly where it may be desirable to employ lower acoustic-wave frequencies, it may be preferred to employ a traveling wave acoustic concave mirror as the dynamic lens, using a thin resilient sheet as the elastic wave-transmitting medium for developing and conducting flexural mode vibrations at a reduced phase velocity. Such a reflection mode embodiment is shown schematically in FIG. 4.

Figure 4:
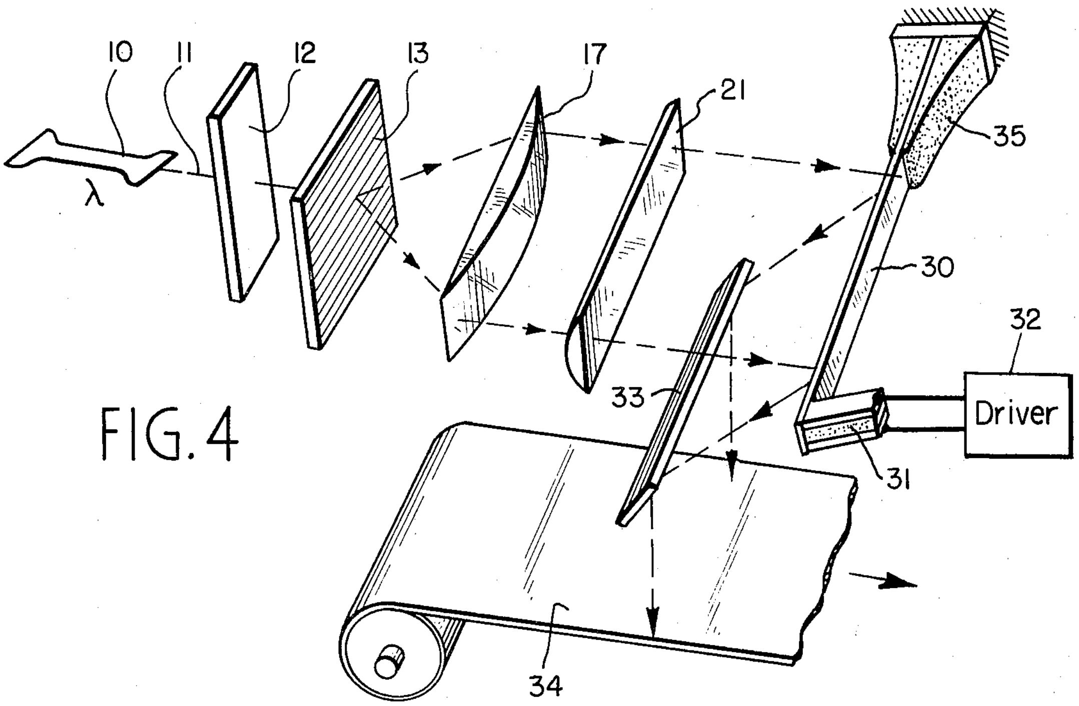
FIG. 4 is a perspective schematic diagram of an alternative embodiment of the invention, in which spot resolution improvement is obtained by the provision of a traveling acoustic wave lens operating in the reflection mode.

As shown in FIG. 4, the scanning input beam, which has been collimated and compensated for ultimate spot symmetry by lenses 17 and 21 of FIG. 1, is projected onto the surface of a thin resilient sheet reflecting element 30 which can be driven in a flexural vibration mode by a transducer 31. Sheet 30 may, for example, be composed of glass of a thickness of 8 to 10 mils. Transducer 31 may be a conventional piezoelectric ceramic element supported at a nodal plane and driven by a signal from a driving signal source 32. The resulting longitudinal extensions and contractions in element 31 effect transverse displacement of the thin resilient reflecting element 30, creating a traveling ripple, or flexural acoustic wave, with a phase velocity determined by the frequency of the driving signal and the properties of the thin resilient sheet. This produces a traveling concave cylindrical mirror (reminiscent of the mythical flying carpet) which moves at the phase velocity of the flexural wave in the strip and functions as a dynamic lens operating in the reflection mode. The output beam is directed by a fixed mirror 33 to a film strip 34 at the focal plane of the dynamic lens, with a mechanical advance system to provide the vertical deflection component. To avoid flexural-wave reflections and undesired standing waves in strip 30, it is of course also desirable to terminate the mirror strip in its characteristic impedance, and this can be done by providing a tapered damping element 35 of polyurethane plastic or the like at the remote end of the strip. As in the case of the dynamic lens water cell of FIG. 1, pulsed actuation may be employed to conserve input power and reduce power dissipation requirements. If desired, instead of using passive damping elements to prevent or eliminate standing waves, an output transducer like the input transducer 31 may be driven by the remote end of the strip 30 and connected to a variable electrical load impedance which can be adjusted to provide a characteristic impedance termination.

An analysis of flexural modes in thin sheets of elastic materials, with emphasis on the lowest-order flexural mode since it is the only propagating mode which shows promise of exhibiting a phase velocity substantially lower than the usual compressional-wave velocities or bulk velocities in elastic media, has been conducted.

For very thin sheets, of sufficient width transverse to the wave propagation direction, the following phase velocity expression has been derived:

$$V_p \approx \sqrt{\frac{\omega TV_s}{\sqrt{6(1-\sigma)}}} \quad (8)$$

where $V_p$ is the flexural-mode phase velocity, $\omega = 2\pi f$ is the radian frequency, T is the total plate thickness, $\sigma$ is Poisson's ratio, and $V_s$ is the bulk shear-wave velocity, given by:

$$V_s=V_D\sqrt{\frac{1-2\sigma}{2(1-\sigma)}} \quad (9)$$

In (9), $V_D$ is the bulk dilational-wave velocity.

Note that Equation (8) is a good approximation whenever the plate is thin enough to produce a calculated phase velocity below about 2,000 meters per second in ordinary materials.

Equation (8) may be rewritten in the following form for later use:

$$V_p=K_M\sqrt{fT} \quad 10.$$

where $$K_M=\sqrt{\pi V_s}\sqrt{\frac{2}{3(1-\sigma)}}=\sqrt{\frac{\pi V_D}{(1-\sigma)}}\sqrt{\frac{(1-2\sigma)}{3}} \quad (11)$$

The materials parameter $K_M$ is tabulated for some representative materials below:

| Material | | $V_D$(m/sec) | $V_s$(m/sec) | $K_M$(m/sec)$^{1/2}$ |
|---|---|---|---|---|
| Stainless Steel | 0.28 | 6100 | 3372 | 101.0 |
| Pyrex Glass | 0.24 | 5600 | 3275 | 98.2 |
| Aluminum | 0.33 | 6300 | 3173 | 99.7 |
| Nickel | 0.31 | 5850 | 3070 | 97.4 |
| Quartz (X-cut) | 0.33 | 5750 | 2896 | 95.3 |

As a rule-of-thumb, we can take $K_M=98\pm3$ (m/sec)$^{1/2}$ for most materials.

The flexural mode wavelength $\Lambda$ is given by:

$$\Lambda=\frac{V_p}{f}=K_M\sqrt{\frac{T}{f}} \qquad (12)$$

As an example, consider a slab of glass of thickness 0.033 inches, or $T=0.837\times10^{-3}$ m, at 100 KHz; Equation (3) yields $V_p=900$ m/sec, and Equation (12) yields $\Lambda=9.0$ mm.

We now consider a pure traveling mode of peak amplitude $X_o$ propagating in the Z-direction; this will form a cylindrical mirror along the $Y$-axis for which we need to compute the focal length $f_o$ and effective aperture or F-number $F_\#$. The wave amplitude is given by:

$$x=x_0\cos\left(\frac{2\pi Z}{\Lambda}-\omega t\right) \qquad (13)$$

At $t=o$, the optic axis is centered on $Z=o$, and its radius of curvature is given by:

$$\frac{1}{R}=\left(\frac{d^2x}{dz^2}\right)_{z=0}=\left(\frac{2\pi}{\Lambda}\right)^2 x_0 \qquad (14)$$

Thus, $$R=\left(\frac{\Lambda^2}{4\pi^2x_0}\right) \qquad (15)$$

and the focal length is:

$$f_o=R/2=(\Lambda^2)/8\pi^2x_o) \qquad 16.$$

If we use an aperture of $\pm45°$ on the sine wave, $$D=\Lambda/4 \qquad 17.$$

and therefore, $$F_\#=\frac{f_0}{D}=\frac{\Lambda}{2\pi^2x_0}=\frac{Vp}{2\pi^2fx_0} \qquad (18)$$

Equation (18) can be inverted to give the required wave amplitude $x_o$ to achieve a given F-number:

$$x_0=\frac{\Lambda}{2\pi^2F_\#}=\frac{v_p}{2\pi^2F_\#f} \qquad (19)$$

The glass-slab example above, to obtain an $F_\#=50$, would require a peak amplitude $x_o$ of 9.1 $\mu$m, corresponding to a focal length $f_o$ of 11.3 cm, and a beam width D of 2.25 mm.

By considering the stored kinetic energy in a standing wave, we can derive the power flow in a single running wave such as to produce the deflection assumed in Equation (13). The power P in a width W is given by:

$$P=\frac{(\omega x_0)^2}{2}\rho WTV_g \qquad (20)$$

where $\rho$ is the (volume) mass density, and $V_g$ is the group (energy) velocity. It can be shown that, in the region for which Equation (8) is a good approximation, the group velocity is just twice the phase velocity, $$V_g=2V_p; \qquad 21.$$

so that (13) becomes:

$$P=4\pi^2(fx_o)^2\rho WTV_p \qquad 22.$$

We now use (12) to eliminate $x_o$ in terms of the F-number, obtaining:

$$(fx_0)^2=\frac{V_p^2}{4\pi^4F_\#^2} \qquad (23)$$

and from (15):

$$P=\frac{\rho WTV_p3}{\pi^2F_\#^2} \qquad (24)$$

Using $\rho=2.3\times10^3$ kg/m$^3$ and W = 1.0 cm, the 0.033 inch-thick glass slab at $F_\#=50$ will require a power of 572 watts in the traveling wave. The required power may be reduced by reducing the thickness and phase velocity. Note that, since velocity varies as $\sqrt{T}$, the power required varies with the (5/2) power of the thickness. Thus, for example, a thickness of 0.011 inch (one-third the previous case) would yield a power of about 37 watts per cm of width.

As a practical example of the foregoing, the following parameters result for a glass plate with television horizontal line scanning standards.

| | |
|---|---|
| Strip thickness | $T=0.010''=0.254\times10^{-3}$m |
| Frequency | $f=100$ KHz $=10^5$ Hz |
| Density | $\rho=2.3\times10^3$ kg/m$^3$ |
| Velocity (3) | $V_p=495.$ m/s |
| Wavelength (5) | $\Lambda=4.95\times10^{-3}$m |
| Scan time | $\tau=52\mu s$ |
| Scan length | $\tau V_p=L=2.57\times10^{-2}$m |
| F-number | $F\#=50$ |
| Input spot size | $(\Lambda/4)=D_o=1.24\times10^{-3}$m |
| No. of spots (IN) | $L/D_o=N_o=21$ |
| Strip width | $W=0.5\times10^{-2}$m |
| Focal length (11) | $f_o=6.2\times10^{-2}$m |
| Peak wave ampl. (12) | $x_o=5.0\times10^{-6}$m |
| Power required (17) | $P=14$ watts |
| Output spot size | $(4/\pi)\lambda F=D_1=40.3\times10^{-6}$m |
| Spot size ratio | $D_o/D_1=31$ |
| No. of spots (OUT) | $N_1=31\times21\approx650$ |

Figure 5:
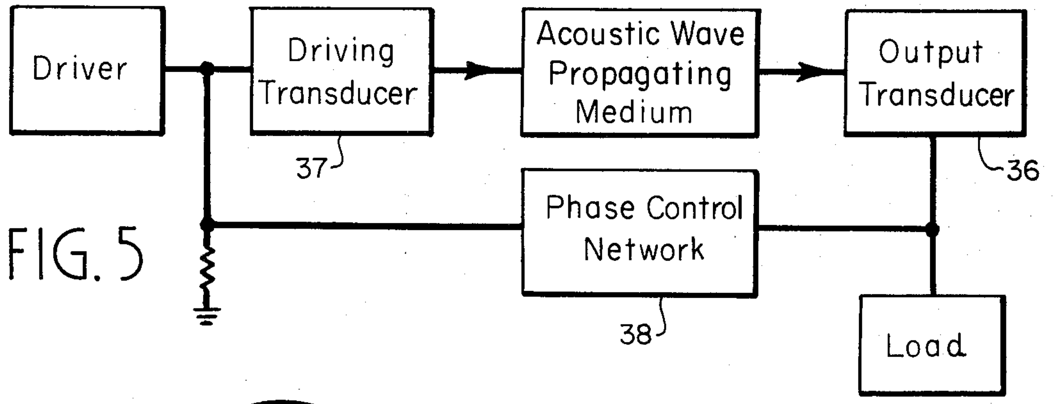
FIG. 5 is a schematic diagram of a further modification of the invention.
Figure 6:
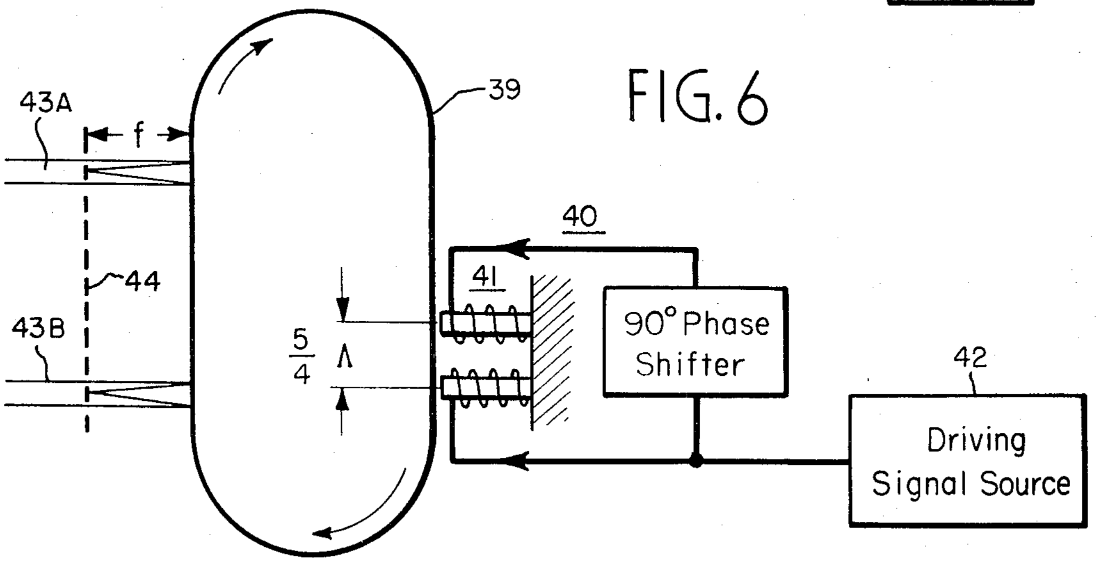
FIG. 6 is a schematic diagram of a modified reflection-mode system embodying the invention.

To conserve on input power and power dissipation requirements, in either the transmission mode or reflection mode embodiments of the invention, power feedback may be provided to establish a flywheel or a race track effect. One particularly simple way of achieving this is to provide an output transducer 36 at the terminating end of the dynamic lens cell or reflective element and provide external electrical feedback loop from the load of the transducer 36 at the output end back to the input transducer 37 through a phase control network 38, as shown schematically in FIG. 5. Acoustic wave feedback may also be provided by employing an acoustic wave transmitting medium in the form of a complete loop, with appropriate dimensions and other characteristics to assure both phase coincidence of the feedback signal with the input signal and effective backward wave attenuation. Such an embodiment is shown in FIG. 6, in which a circulating lowest-order acoustic flexural wave is excited on a fixed resonant ring 39 by means of a directional exciter 40 shown schematically as comprising a pair of solenoids 41 spaced by 5/4Λ in the direction of flexural wave propagation (indicated by the arrows) and driven in phase quadrature from a common driving signal source 42. The horizontally scanning input beam is shown in its limiting positions 43A and 43B, and image utilization means such as a film may be provided at the focal plane 44 at a distance from the traveling wave mirror corresponding to the focal length $f$ of the dynamic lens established thereby.

Figure 7:
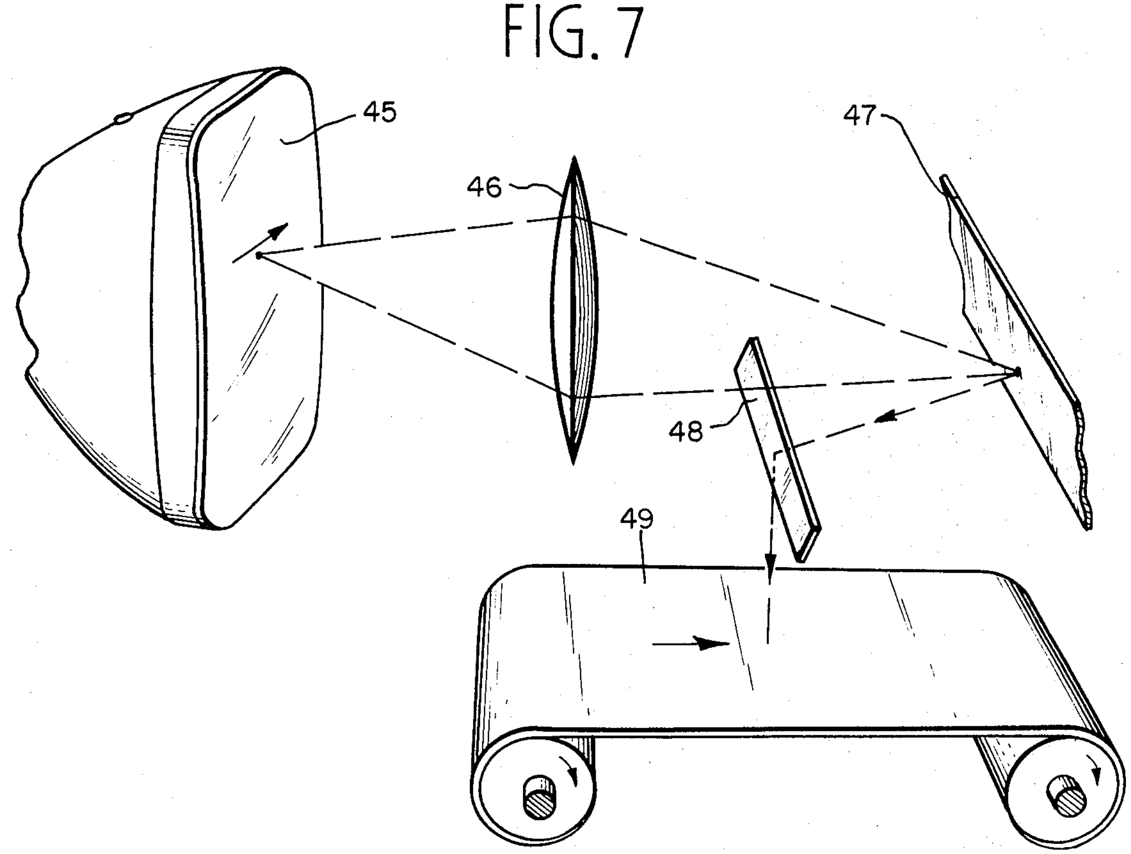
FIG. 7 is a perspective schematic diagram of still another embodiment in which the invention is employed to improve the spot resolution obtainable with a cathode-ray tube scanner.

It is also of considerable importance to note that the dynamic acoustic wave cylindrical lens established in either transmission mode embodiments such as FIG. 1 or reflection mode embodiments such as FIG. 4 is not color sensitive, and that therefore spot resolution improvement may be obtained in polychromatic optical systems. There is also no requirement for phase coherence of the input beam. Thus, for example, as shown in FIG. 7, the image produced by a standard cathode-ray tube 45 may be projected through an imaging lens 46 onto a reflection-mode dynamic cylindrical acoustic wave lens 47, and thence by way of a fixed mirror 48 onto a film target 49. Horizontal scanning of the electron beam in the direction represented by the arrow on the face of the picture tube is reversed at dynamic lens mirror 47. With this system, overlapping images at the scanning mirror 47 become separate images at the film plane 49. In order to realize an overall improvement in picture resolution, it is necessary of course for the time constant of the phosphor constituting the image screen of picture tube 45 to be short enough to provide brightness variations sufficient to accommodate effective contrast with the improved resolution in the final image. For example, if the phosphor time constant is 0.16 microseconds, then the system cannot resolve or produce final images containing frequency components in excess of 1 megaHertz. However, in slow scan systems, the phosphor time constant does not impose a limitation and full advantage may be taken of the resolution improvement provided by the dynamic lens.

Figure 8:
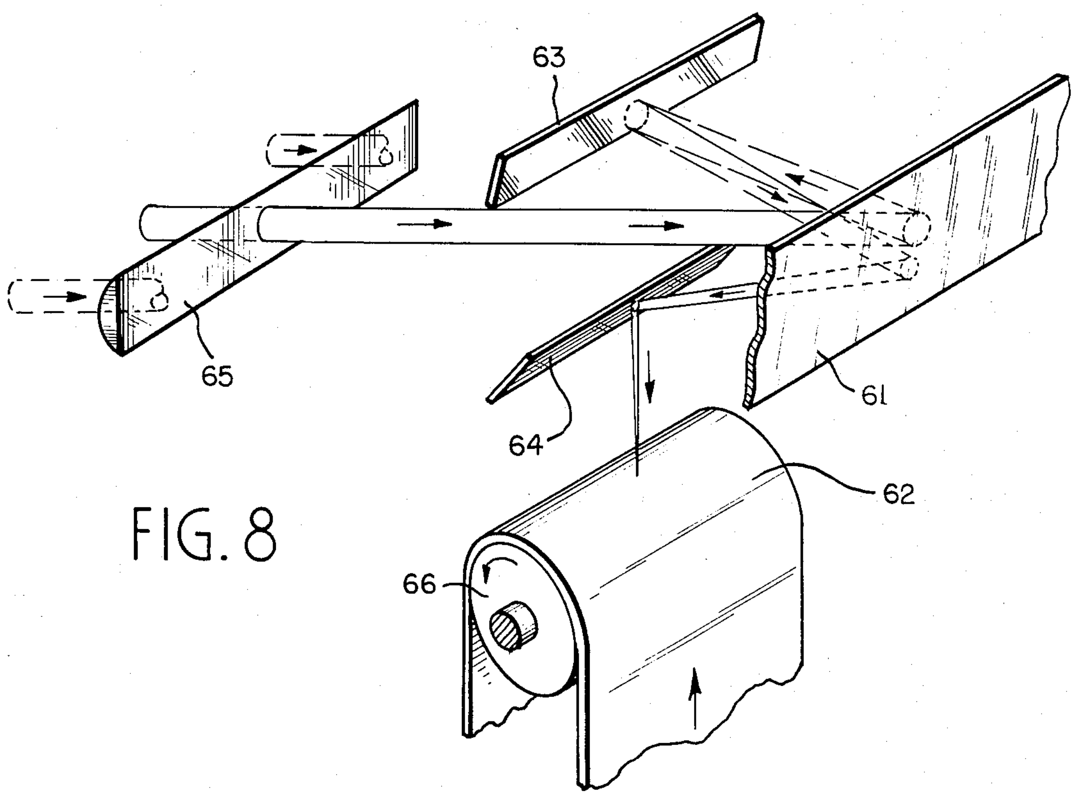
FIG. 8 is a schematic diagram illustrating a further modification of the invention.

It is also significant that, in practice as well as in principle, two or more dynamic lenses may be cascaded to increase the resolution improvement or spot number advantage to a greater extent than that resulting from the use of a single lens. Indeed, the output beam from the dynamic lens may be returned through a suitable external optical system back to the lens to make a second pass through a different portion of the same lens for further resolution improvement; in transmission-mode versions, the second pass may be made in either direction through the dynamic lens cell, and in either transmission-mode or reflection-mode embodiments the second pass may utilize either a different cycle of the acoustic wave or the same cycle at a portion of the medium displaced from the first pass. This is particularly convenient in a reflection-mode system, where a plane mirror 63 may be provided to reflect the output beam onto another portion of the vibrating mirror strip 61 and thence to the film or other image target 62 as shown in FIG. 8 which shows a flexural-wave recorder in which a flex-wave mirror 61 is used for spot enhancement of a horizontally scanning beam, while vertical scanning is supplied by the longitudinal motion of the film 62. In the figure, fixed mirrors 63 and 64 provide for redirecting of the beam axis. Focusing in the plane perpendicular to the scan direction is provided by cylindrical lens 65; mirrors and/or prisms could equally well be employed for this purpose. Two sequential passes of the scanning beam through the dynamic lens constituted by the traveling mirror are illustrated. Positioning of the film in the focal plane is particularly simple with the arrangement shown, by simply positioning an idler roller 56 tangent to the flat horizontally oriented focal plane along the horizontal line traced by the recording light beam from mirror 64. An arrangement similar to FIG. 8 may also be readily visualized for the dilational-wave case.

Since the flexural mode is dispersive, i.e., the phase velocity varies as the square root of frequency, some degree of control of velocity can be implemented merely by tuning the acoustic frequency. This may be of value in a system which requires manual or automatic control of scan length, e.g., to compensate for transverse film shrinkage, etc.

Thus the invention provides a simple and extremely practical system for enhancing picture resolution or effective bandwidth of linear optical scanning systems. The invention does not require the use of either coherent or monochromatic light and may be employed to achieve optical resolutions greatly in excess of those obtainable in previous non-mechanical scanning systems.

While particular embodiments of the invention have been shown and described, it will be obvious to those skilled in the art that changes and modifications may be made without departing from the invention in its broader aspects, and, therefore, the aim in the appended claims is to cover all such changes and modifications as may fall within the true spirit and scope of the invention.

I claim:

1. A high resolution optical scanning system comprising:

means for developing a light beam and for scanning said beam within a predetermined scanning plane with a scanning resolution corresponding to a predetermined beam diameter;

means for establishing a dynamic acoustic wave focusing lens moving in time and position synchronism with said scanning light beam to improve said scanning resolution comprising an electro-mechanical input transducer coupled to an acoustic-wave propagating medium for projecting an acoustic wave of wavelength larger than said beam diameter in said scanning plane in a direction transverse to said scanning light beam;

and utilization means for responding to the light beam of improved resolution from said dynamic lens.

2. An optical scanning system according to claim 1, in which the acoustic wavelength of said wave in said medium is substantially four times said beam diameter.

3. An optical scanning system according to claim 1, in which said acoustic wave propagating medium is transparent and said dynamic lens establishing means is a light-sound interaction cell operating in a transmission mode.

4. An optical scanning system according to claim 3, in which said acoustic wave propagating medium is a liquid medium.

5. An optical scanning system according to claim 1, in which said dynamic lens is a cylindrical lens having an axis substantially perpendicular to said scanning plane, and in which a static cylindrical lens with its axis substantially parallel to said scanning plane is provided in tandem with said dynamic lens to provide an output beam with substantial circular symmetry.

6. An optical scanning system according to claim 1, in which said means for developing a linearly scanning light beam comprises a laser scanning system.

7. A scanning system according to claim 1, in which said means for developing a scanning light beam comprises a cathode-ray tube for sweeping an electron beam across a phosphor screen in said scanning plane, and which further comprises an imaging lens for directing the light output from said phosphor screen onto said dynamic focusing lens.

8. An optical scanning system according to claim 1, which further includes means for driving said transducer with an electrical signal of predetermined fixed frequency.

9. An optical scanning system according to claim 8, which further comprises means for deriving energy from said acoustic wave propagating medium and feeding said energy back to said medium to reduce the driving power requirements for said transducer.

10. An optical scanning system according to claim 9, in which said feedback means comprises an additional electromechanical transducer coupled to said acoustic wave propagating medium and an electrical feedback circuit from said additional transducer to said input transducer.

11. An optical scanning system according to claim 9, in which said acoustic wave propagating medium is formed in a closed loop for acoustic energy feedback.

12. A high-resolution optical scanning system comprising:

means for developing a light beam and for scanning said beam within a predetermined scanning plane with a scanning resolution corresponding to a predetermined beam diameter;

means for establishing a dynamic acoustic wave focusing lens in frequency and phase synchronism with said scanning light beam to improve said scanning resolution comprising a thin resilient-sheet reflecting element and an electro-mechanical transducer coupled thereto for propagating flexural mode acoustic waves therein to provide a traveling acoustic mirror traveling in frequency and phase synchronism with said scanning light beam in said scanning plane in a direction transverse to said scanning light beam;

and utilization means for responding to the light beam of improved resolution from said dynamic lens.

13. An optical scanning system according to claim 12, in which said light-sound interaction cell is terminated substantially in its characteristic impedance to avoid standing waves in said medium.

14. Apparatus according to claim 12, in which said acoustic wave transmitting medium is reflective to said light beam and said apparatus operates in a reflection mode.

15. An optical scanning system according to claim 12, in which said acoustic waves are of a frequency corresponding to that of the lowest-order flexural mode for said element.

16. A high-resolution optical scanning system comprising:

means for developing a light beam and for scanning said beam within a predetermined scanning plane with a scanning resolution corresponding to a predetermined beam diameter;

means for establishing a dynamic acoustic wave focusing lens in frequency and phase synchronism with said scanning light beam to improve said scanning resolution comprising an electro-mechanical input transducer coupled to an acoustic-wave propagating medium for projecting an acoustic wave in said scanning plane in a direction transverse to said scanning light beam, and means for applying to said transducer a pulsed driving signal with a repetition rate corresponding to the scanning frequency of said light beam;

and utilization means for responding to the light beam of improved resolution from said dynamic lens.

17. A high-resolution linear optical scanning system comprising:

means for developing a light beam and for linearly scanning said beam within a predetermined scanning plane with a scanning resolution corresponding to a predetermined beam diameter;

means for establishing a dynamic acoustic wave focusing lens in frequency and phase synchronism with said scanning light beam to improve said scanning resolution comprising an electro-mechanical input transducer coupled to an acoustic-wave propagating medium for projecting an acoustic wave in said scanning plane in a direction transverse to said scanning light beam;

and utilization means for responding to the light beam of improved resolution from said dynamic lens, and means including means for returning the output beam from said dynamic lens through said dynamic lens a second time to provide further improvement in said scanning resolution.

18. Apparatus for use in combination with an optical scanning system for scanning a light beam in a predetermined plane centered on a predetermined axis with a predetermined spot resolution corresponding to a predetermined beam diameter, which apparatus comprises means for substantially increasing said spot resolution including an electromechanical transducer coupled to an acoustic wave transmitting medium for projecting a traveling acoustic wave convergent lens larger than said beam diameter across said axis in time and position synchronism with said scanning beam.

19. Apparatus according to claim 18, in which said acoustic wave transmitting medium is transparent to said light beam and said apparatus operates in a transmission mode.

20. For use in an optical scanning system including a light beam which is caused to move in a predetermined direction, a system for altering a predetermined optical characteristic of the light beam as it is scanned, comprising:

wave propagating means for propagating an elastic wave in the direction of movement of said light beam; and wave generating means coupled to said propagating means for launching a traveling elastic wave in said propagating means traveling in time and position synchronism with said light beam such that said wave follows and interacts with said beam as it is scanned, said wave having a length greater than the width of said light beam in the region of interaction with said wave, said wave generating means imparting to said wave an optical characteristic effective to alter a predetermined optical characteristic of said light beam as it is scanned along said scan line.

21. The apparatus defined by claim 20 wherein said elastic wave is a compressional acoustic wave, wherein said wave generating means includes a surface which is vibrated to launch said wave, and wherein said wave propagating means includes an optically transmissive medium interfaced with said vibrated surface for propagating the acoustic wave, and wherein said wave generating means imparts a shape to said wave which causes said wave to have a predetermined optical power in at least one dimension thereof.

22. The apparatus defined by claim 21 wherein said wave generating means imparts a shape to said acoustic wave which is such that said wave has an optical power effective to converge said light beam.

23. The apparatus defined by claim 20 wherein said propagating means includes a surface which has a predetermined optical characteristic and which is capable of propagating a flexural wave, wherein said elastic wave is a flexural elastic wave, wherein said wave generating means includes means for launching a flexural elastic wave on said surface of said wave propagating means, and wherein said wave generating means imparts a shape to said elastic wave which is such that said wave has a predetermined optical power in at least one dimension thereof.

24. The apparatus defined by claim 23 wherein said surface of said propagating means is optically reflective, and wherein said shape of said wave as determined by said wave generating means is effective to converge said light beam.

* * * * *